March 25, 1941.   C. D. LEE   2,235,894
DEVICE FOR RECORDING PULSE WAVES, RESPIRATION,
AND BLOOD PRESSURE CHANGES
Filed Jan. 18, 1938   3 Sheets-Sheet 1

INVENTOR.
CLARENCE D. LEE
BY Munn, Anderson & Liddy
ATTORNEYS.

March 25, 1941.         C. D. LEE              2,235,894
            DEVICE FOR RECORDING PULSE WAVES, RESPIRATION,
                    AND BLOOD PRESSURE CHANGES
                   Filed Jan. 18, 1938        3 Sheets-Sheet 2

INVENTOR.
CLARENCE D. LEE
BY Munn, Anderson & Liddy
ATTORNEYS.

March 25, 1941. C. D. LEE 2,235,894
DEVICE FOR RECORDING PULSE WAVES, RESPIRATION,
AND BLOOD PRESSURE CHANGES
Filed Jan. 18, 1938 3 Sheets-Sheet 3

INVENTOR.
CLARENCE D. LEE
BY
Munn, Anderson & Liddy
ATTORNEYS.

Patented Mar. 25, 1941

2,235,894

UNITED STATES PATENT OFFICE 2,235,894

DEVICE FOR RECORDING PULSE WAVES, RESPIRATION, AND BLOOD PRESSURE CHANGES

Clarence D. Lee, Berkeley, Calif.

Application January 18, 1938, Serial No. 185,540

12 Claims. (Cl. 128—2.05)

My invention relates to improvements in a device for recording pulse waves, respiration and blood pressure changes, and it consists of the combinations, constructions and arrangements hereinafter described and claimed.

An object of my invention is to provide a device for recording pulse waves, respiration and blood pressure changes, which will make a graphical record of the pulse waves, blood pressure-variations, and the respiration in the human body. The device can also be used in clinical work for the study of the circulation of the blood. The drawings illustrate the device when used as a psychograph (lie detector). The device makes use of a cardiograph for making a record of the pulse waves of the person being examined. A pneumograph is also used with the device and this will make a record of the individual's respiration. In addition to these two units, a signal device is employed for making marks on the chart at any desired point. The cardiograph, the pneumograph, and the signal device, all operate pens that move over a graph chart which in turn is moved at a predetermined speed by any desired mechanism such as by a synchronous motor.

The cardiograph and pneumograph units are novel in construction and are so designed that they will move the pens over the chart without any outside power being necessary other than that obtained from the pulse and the breathing of the individual being examined. The entire device is also made so simple as to be readily disassembled and assembled without the need of any tools. This permits the diaphragms used in the various units to be quickly changed.

Other objects and advantages will appear in the following specification, and the novel features of the device will be particularly pointed out in the appended claims.

My invention is illustrated in the accompanying drawings forming a part of this application, in which Figure 1 is a top plan view of a portion of the device;

Figure 1:
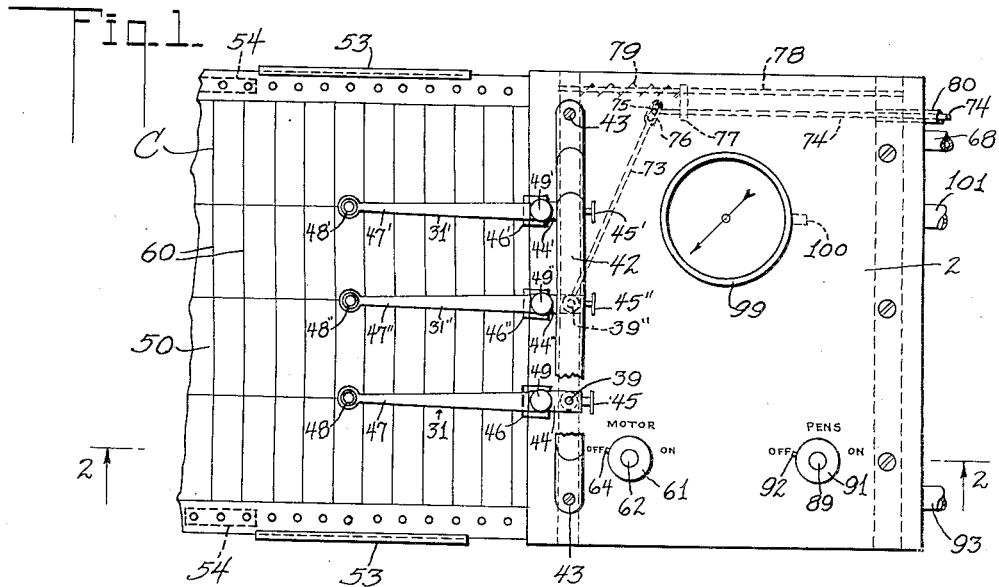
Figure 2:
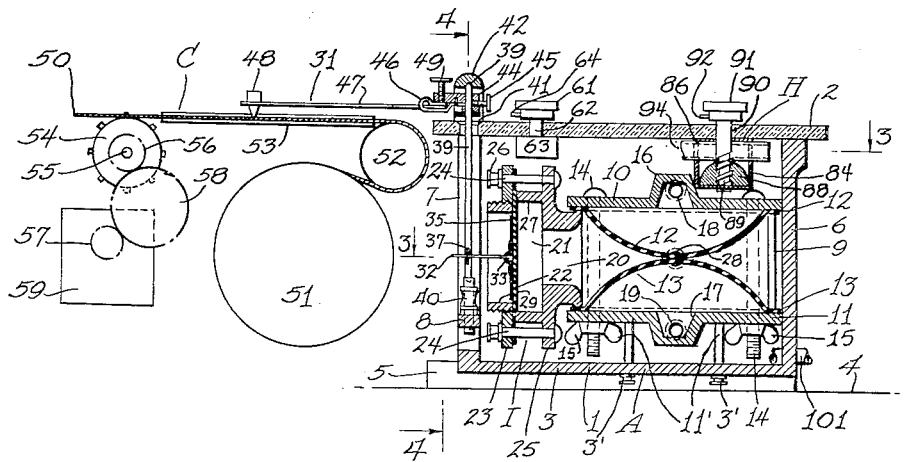
Figure 2 is a section substantially along the line 2—2 of Figure 1 and shows the chart drive diagrammatically.
Figure 3:
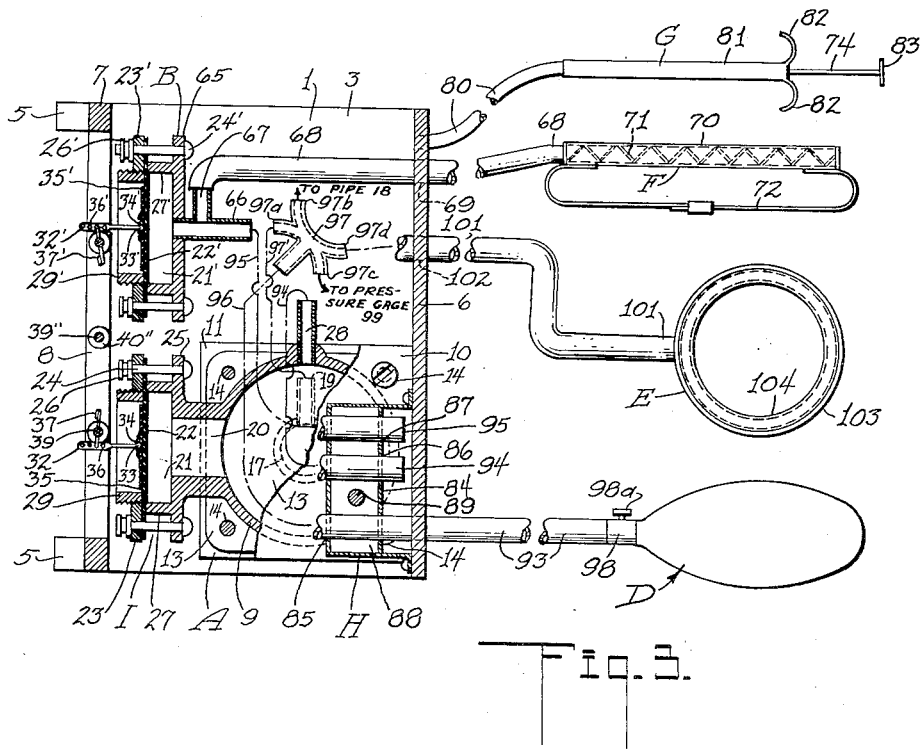
Figure 3 is a section substantially along the line 3—3 of Figure 2 and shows the various parts used in connection with the cardiograph, pneumograph and signal device.

In carrying out my invention, I provide a casting indicated generally at 1, in which I mount a cardiograph unit indicated generally at A, in Figure 3, and a pneumograph unit indicated generally at B. Figures 1 and 2 show a chart drive mechanism indicated generally at C associated with the cardiograph and pneumograph units. In actual practice, the casting 1 containing the units A and B, will be placed in a box (not shown) and the chart drive C will be placed alongside the casting. The box will be made large enough to provide a space for receiving a pump bulb D, see Figure 3, a pressure bag E, for the arm, and a receptor F, for the chest. A signal device G is also receivable in the space. All of these parts will be explained more in detail hereinafter. The box is provided with a cover and when the cover is closed, all of the parts will be concealed so that the entire device may be readily carried.

I will describe the cardiograph, then the chart drive, the pneumograph, the signal device, and a shut off valve H, in the order named.

Cardiograph

The casting 1 has a panel 2 which is preferably made of Bakelite, see Figure 2. The casting has its bottom wall 3, spaced above a supporting surface 4 which constitutes the bottom of the box, not shown. The bottom 3 is supported by legs 5 that extend transversely across the two ends of the casting. The casting is also provided with a rear wall 6 and front corner posts 7. It will also be seen from Figures 2 and 4 that a bar 8 extends across the front of the casting and is disposed near the bottom wall 3.

The cardiograph A is shown in section in Figures 2 and 3 and it comprises a cylinder 9 placed between a top plate 10 and a bottom plate 11. Rubber diaphragms 12 and 13 are placed between the plates and the cylinder, and the cylinder hermetically seals the diaphragms to the plates when the plates are secured to the cylinder by bolts 14 and wing nuts 15. Figure 3 shows four bolts 14 being used. The lower plate 11 has legs 11' for supporting it above the bottom wall 3. Screws 3' hold the legs to the bottom wall.

The plates 10 and 11 have dome-shaped recesses 16 and 17 respectively, and pipes 18 and 19 communicate with these recesses. I will describe hereinafter how air, under pressure, is forced into the pipes 18 and 19 for expanding the diaphragms 12 and 13 into the semi-spherical shape shown in Figure 2. The air confined within the diaphragms and their associated plates is at a higher pressure than that confined in the portion of the cylinder disposed between the two diaphragms. In other words, the cylinder will contain two high pressure regions and one low pressure region. It will further be noted that as the diaphragms are expanded by the air pressure, they will first contact with each other at the center of the cylinder, and yet the diaphragms will be sensitive to variations in pulse beat pressures in a manner hereinafter described.

The pressure chamber containing the high and low pressure regions has a tambour I, connected therewith. Figures 2 and 3 show the cylinder 9 as being provided with an air passage 20 that communicates with an air chamber 21. A membrane or diaphragm 22 is stretched across the open end of the chamber 21 and is connected to a removable plate 23 by bolts 24. The bolts are passed through openings in the diaphragm 22 and are also passed through aligned openings in the plate 23 and in a flange 25. Nuts 26 are mounted on the bolts 24 and when tightened by hand, will cause the cylinder wall 27 of the air chamber 21 to hermetically seal the membrane 22. Figure 3 shows a pipe 28 extending through the cylinder wall 9, and this pipe may be closed by a means hereinafter described and will trap air in the low pressure region. It will therefore, be seen that variations in the air pressure in the high pressure regions will vary the pressure in the low pressure region and this will cause the membrane 22 to flex in accordance with these air pressure changes.

Figure 6:
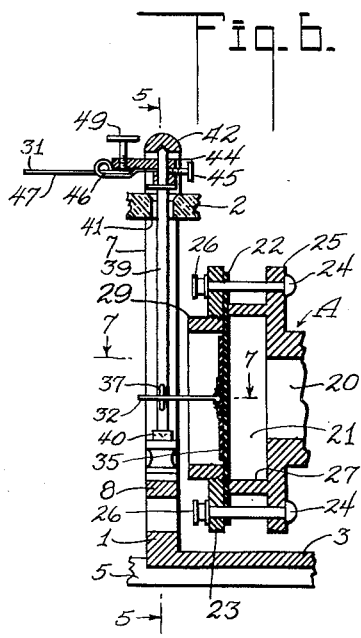
Figure 6 is a section along the line 6—6 on Figure 5.
Figure 5:
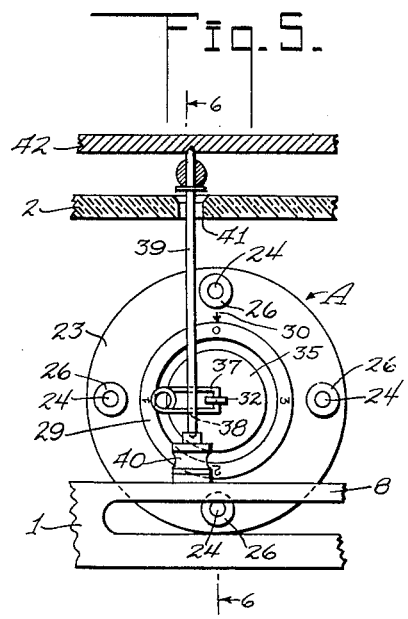
Figure 5 is a section along the line 5—5 on Figure 6.
Figure 7:
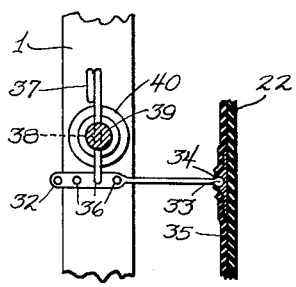
Figure 7 is a section along the line 7—7 on Figure 6.
Figure 8:
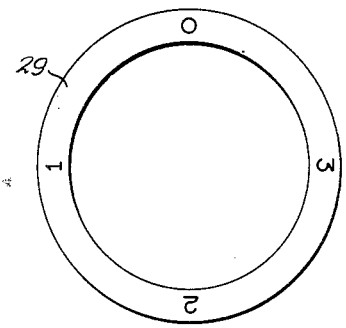
Figure 8 is a front elevation of the compression ring.

In order to stretch the membrane 22 to the desired extent, I provide a tension ring 29. This ring is threaded into a threaded opening in the plate 23 and it may be rotated for pressing against the membrane 22 to the desired extent. The ring is marked with the numbers 0, 1, 2, and 3, see Figures 4 and 8, and the number 0 will register with an arrow 30 marked on the plate 23 when the inner edge of the ring is flush with the inner surface of the plate. A quarter turn of the ring in a clockwise direction, when looking at Figures 4 and 6, will bring the number 1 into registration with the arrow 30. The ring will be moved inwardly by this rotation and will stretch the diaphragm 22. The rotation of the tension ring is continued in the same direction until the diaphragm 22 offers a slight resistance. Usually a half or three-quarter turn of the ring will give the desired tension to the diaphragm 22.

The diaphragm 22 is connected to a pen mechanism, indicated generally at 31 in Figure 2 in the following manner. A link 32, see Figures 3, 5, 6 and 7, has a spherical head 33, received in a socket 34 and this socket is held against the diaphragm 22 by a rubber disc 35 that covers the socket and is cemented to the diaphragm 22. The rubber disc has an opening through which the link extends. The free end of the link is provided with a plurality of openings 36 and a sliding spring lever arm 37, see Figures 4, 5, 6 and 7, is pivotally mounted in the desired opening 36. The lever arm 37 is in the nature of a spring and is slidably received in openings 38 formed in a pen shaft 39. The spring action of the arm frictionally engages with the sides of the openings 38 and it therefore will be held in the position into which it is moved. In this way the amount of rocking imparted to the pen shaft 39 may be varied at will.

Figure 4:
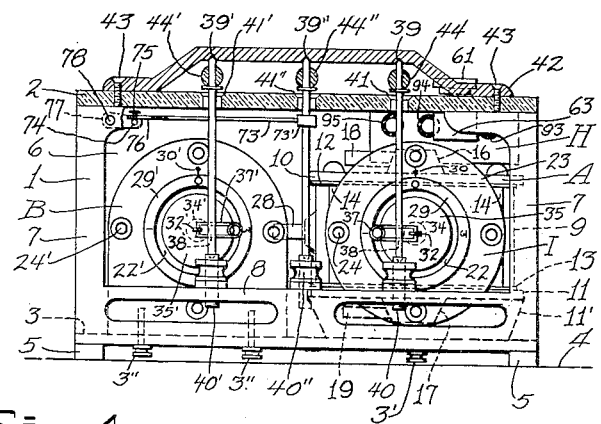
Figure 4 is a section substantially along the line 4—4 of Figure 2.

Figure 4 also shows the pen shaft 39 mounted in an adustable bearing 40 carried by the cross bar 8. Figure 4 also shows the pen shaft extending through an opening 41 in the panel 2. A bearing bar 42 is secured to the panel by screws 43 and rotatably receives the top of the pen shaft 39. Figure 2 shows the shaft 39 carrying a pen holder 44 and this pen holder is adjustably secured in place by a set screw 45. The pen holder carries a spring socket 46 that receives the inner end of a pen arm 47. The outer end of the pen arm carries a pen point 48 which is in the form of a cylinder with a conical bottom provided with a small orifice through which the ink carried in the cylinder will gradually flow. The arm 47 may be raised or lowered vertically by a set crew 49. In this way the proper amount of pressure may be applied on the arm for causing the ink to flow onto the chart.

Chart drive

The chart drive is shown diagrammatically in Figure 2. A chart 50 is fed from a roll indicated generally at 51 and is passed around an idler roll 52. The chart is then moved between guides 53 and over sprocket wheels 54. The sprocket wheels are mounted on a common shaft 55 and this shaft carries a gear 56. The gear 56 is operatively connected to a motor driven gear 57 by an intermediate gear 58. The gearing is such as to cause the chart 50 to move at a predetermined speed. The motor 59 is preferably of a synchronous type so that the gear 57 will rotate at a certain speed and thus cause the chart to move a predetermined distance in a definite time period. In Figure 1, I show the chart 50 as being marked off by lines 60, and these lines indicate intervals of time. When the device is placed in the box, not shown, one end of the box is preferably provided with a slot through which the chart will feed.

A panel knob 61 is shown in Figures 1 and 2 and this knob is connected to a shaft 62 that operates a switch indicated generally at 63. The switch when closed, electrically connects the synchronous motor 59, with a source of current, not shown. The panel 2 has the word "Motor" stamped thereon, at a place adjacent to the knob 61. The words "Off" and "On" are also stamped on the panel in proper positions with respect to the knob. A pointer 64 is carried by the knob and when the switch is open, the pointer will be directed to the "Off" position. A turning of the knob in a clockwise direction will swing the pointer 64 to the word "On." This movement will close the switch and the self-starting synchronous motor 59 will immediately operate to feed the chart 50 beneath the pen 48 at a predetermined speed. It is obvious that any other type of chart-moving mechanism may be employed without departing from the spirit and scope of my invention.

Pneumograph

As already stated the pneumograph is shown at B, in Figures 3 and 4. The pneumograph consists of a tambour that is identical to the tambour I, except that the plate 65, differs from the flanged member 25, in that it does not communicate with a low pressure region in a cylinder corresponding to the cylinder 9. Since all of the other parts of the pneumograph are identical to the tambour I, corresponding parts will be given like reference numerals, except that these numerals will be primed. The plate 65 supports an outlet pipe 66 communicating with the air chamber 21'. The pipe 66 has a branch 67 to which a flexible tube 68 is connected.

The tube 68 extends through an opening 69 in the rear wall 6 of the casting 1 and is connected to the pick-up or receptor F, see Figure 3. The receptor F is of a standard construction and consists of a thin-walled rubber tubing 70 that is placed over a coil spring 71. The tube 68 communicates with the tubing 70. An adjustable strap 72 is connected to the ends of the tubing 70 and is designed to pass around the back of the person to be examined and to hold the tube 70 across the chest. The strap 72 is tightened to hold the tube 70 in place, and the normal breathing of the person will cause the tubing 70 to be lengthened and shortened directly in accordance with the breathing of the person. This will alter the capacity of the tubing 70 and will cause pulsations of air to flow through the tube 68.

These pulsations will flex the diaphragm 22' and the diaphragm in turn will cause the link 32' to swing the shaft lever arm 37', which in turn will rock the pen shaft 39' about its vertical axis. Figure 4 shows the shaft 39' extending through an opening 41' in the panel 2 and as being journalled in the bearing bar 42. The top of the pen shaft 39' carries the pen holder 44' and Figure 1 shows the pen holder as carrying a pen arm 47', which supports a pen 48' at its free end. The pen 48' is moved laterally and will make a graph on the chart 50 in direct accordance with the respiration of the individual being examined.

The purpose of the pipe 66 will be described hereinafter. The front plate 23' extends down to the floor 3 of the casting and screws 3'' secure it in place, see Figure 4.

*Signal device*

The signal device is shown in Figures 1, 3, and 4. The device operates a pen mechanism identical to the pen shaft 39, pen holder 44 and the pen 48. Since these parts are identical, corresponding reference numerals will be given, except that they will be double primed. The shaft 39'', see Figure 4, is shown centrally disposed between the shafts 39 and 39'. Any mechanism for rocking this shaft on its vertical axis will suffice and I have illustrated one such mechanism as comprising an arm 73, see Figure 1, connected to the shaft 39'' by a collar 73'. The free end of the arm 73 may be connected to the inner end of a flexible plunger shaft 74, see Figure 1, by any means desired, such as by a pin 75 sliding in a slot 76 formed in the free end of the arm 73. The inner end of the plunger shaft 74 may be supported by a collar 77 and this collar freely slides on a rod 78 that in turn is supported by the casting 1. A coil spring 79 is mounted on the rod 78 and returns the collar 77 to normal position which will bring the pen 48'' back into a zero reading.

The flexible plunger shaft 74 extends through a flexible cable 80 supported by the rear wall 6, and this cable, see Figure 3, leads to a casing 81 that has wings 82 for receiving two fingers of the hand. The flexible plunger shaft 74 extends through the casing 81 and is provided with a head 83 that may be depressed by the means of the thumb. If desired, the casing 81 may contain a spring, not shown, for returning the head 83 to normal position after it has been depressed by the thumb. In this event the spring 79 may be dispensed with. Any other means for moving the pen 48'' may also be used.

It will be seen from this construction that each time the head 83 is manually depressed, the flexible shaft 74 will be actuated for swinging the arm 73 and rocking the shaft 39'' for moving the pen 48''. Since the pen 48'' is filled with ink, it will make a transverse mark on the chart 50. The head 83 may be depressed as often as desired and when the device is used as a lie detector, the head is pressed each time a question is asked the individual being examined.

*Shut-off valve*

This valve is shown in Figures 2 and 3 and it comprises a casing 84 that is carried by the rear wall 6 of the casting 1. This casing has three sets of aligned openings 85, 86 and 87 in its side walls, and these openings are disposed near the top of the casing. A clamping member 88 is disposed in the casing 84 and Figure 2 shows the top surface of this member as being semi-cylindrical. The member extends throughout the length of the casing and it may be raised and lowered by means of a screw shaft 89. This shaft is threaded into the clamping member and extends through an opening 90 in the panel 2. A knob 91 is mounted on the shaft 89 and a turning of this knob will rotate the shaft for raising the clamping member 88 toward the top of the casing 84.

Figure 1 shows the panel 2 provided with the word "Pens" adjacent to the knob 91. The words "Off" and "On" are also associated with the same knob and a pointer 92 is carried by the knob and points to the word "Off" when the clamping member 88 is disposed at the bottom of the casing 84. When the knob is rotated so that the pointer 92 will indicate the "On" position, the screw shaft 89 will raise the clamping member to a position near the top of the casing.

Figure 3 shows three rubber tubes 93, 94 and 95, extending through the aligned openings 85, 86 and 87, respectively. The tube 93 connects with the pump bulb D and with a header 97. In order to avoid confusion, a portion of the tube 93 extending from the casing 84 to the header 97, is shown diagrammatically by a single line. Portions of other tubes are shown in like manner. An air leak valve of standard construction is shown at 98 and is disposed between the pump bulb D and the tube 93. The tube 94 extends to the pipe 28 that communicates with the low pressure chamber in the cylinder 9. The tube 95 extends to the pipe 66 and communicates with the air chamber 21'. The tubes 94 and 95 terminate adjacent to the rear wall 6, and open to the atmosphere. When the knob 91 is turned into the "On" position, the clamping member 88 will be raised and will squeeze all of the tubes 93, 94 and 95 shut, and make an air-tight seal for these tubes during the operation of the device.

Before describing the operation of the device it is best to state that the other four outlets of the header 97 are connected to different parts of the device by rubber tubing. The outlet 97a is connected to the pipe 19 of the high pressure area in the cylinder 9 by a tube 97', while the outlet 97b is connected by a tube, not shown, to the pipe 18 communicating with the upper high pressure area in the cylinder 9. The outlet 97c is connected by a tube, not shown, to a blood pressure gage 99 shown in Figure 1. The rubber tube that extends from the outlet 97c, communicates with a stub pipe 100 that leads to the operating mechanism in the gage 99. The gage is preferably calibrated in centimeters and indicates the blood pressure in the body.

The outlet 97d of the header, has a rubber tube 101 connected therewith and extending through an opening 102 in the rear wall 6 of the casting 1. This rubber tube 101 connects with the pick-up E of standard construction. The pick-up E consists of a sleeve 103 designed to encircle the arm of the individual and the sleeve contains a flexible rubber compartment 104 that receives air under pressure by means of the tube 101. The pressure of the air pumped into the bag 104 is indicated by the blood pressure gage 99.

*Operation*

From the foregoing description of the various parts of the device, the operation thereof may be readily understood.

The receptor F is strapped in place so that the tubing 70 will extend across the chest. While this is being done the knobs 61 and 91 remain in the "Off" position and therefore the manipulation of the tube 70, will not cause the pen 48' to move. The knob 91 when in "Off" position will open the tube 95 and this will place the air chamber 21' in communication with the atmosphere. It is for this reason that any changes in the air capacity of the tube 70, while being placed in position on the chest, will not flex the diaphragm 22' and will not cause the pen 48' to move.

The pressure bag E is now placed over the arm of the person. The rubber compartment 104 of the pressure bag is now via tube 96 inflated by actuating the inflating bulb D. A thumb nut 98a on the air-leak valve 98 is rotated into closed position during the actuation of the pump bulb D. The bulb D will therefore force air through the tubing 93, the header 97 and out through the outlets 97a and 97b to the pipes 18 and 19 where the air will enter the high pressure regions in the cylinder 9 and inflate the diaphragms 12 and 13. At the same time air will be delivered through the header outlets 97c and 97d to the pressure gage 99 and to the rubber bag 104. When the desired amount of air pressure is reached, as shown by the gage 99, the panel knob 91 is turned from the "Off" position into the "On" position. This will lift the member 88 and close the tubes 93, 94 and 95. During the inflation of the diaphragms 12 and 13, the pen 48 also remains at zero reading because the low pressure region in the air chamber 21 communicates with the atmosphere through the tubing 94. Any flexing of the diaphragms 12 and 13 caused by the pulse of the individual being examined, will have no effect upon the diaphragm 22, until the tubing 94 is closed. The device is now ready to actually record the respiration and the pulse beat of the individual.

The panel knob 61 is now turned into the "On" position and this closes the electric circuit to the self-starting synchronous motor 59. The chart 50 will therefore move at a given rate of speed so that the lines 60 will indicate definite time periods. The pulse beat of the individual will vary the capacity of the bag 104 and this in turn will cause pulse waves to flow through the tubing 101, header 97, to the pipes 18 and 19 by means of the tubing 97' and the tubing, not shown, connecting the outlet 97b to the pipe 19. The pulse of the individual will therefore cause the diaphragms 12 and 13 to flex in direct proportion to the pulse beat, and this flexing of the diaphragms will alter the capacity of the low pressure region. Since the low pressure region in the cylinder 9 has been cut off from communication with the atmosphere by the closing of the tube 94, the variations in the capacity of the low pressure region will cause the diaphragm 22 to flex in direct ratio with the diaphragms 12 and 13. It will therefore be seen that the diaphragm 22 will be flexed in direct ratio to the pulse waves of the individual.

The flexing of the diaphragm 22 will reciprocate the link 36 and by means of the arm 37 will rock the pen shaft 39. This movement will swing the pen arm 47 and will cause the pen 48 to make a graph on the moving chart 50 in direct accordance to the pulse wave of the individual.

At the same time the normal breathing of the person will change the capacity of the rubber tubing 70 and this will cause a variation of air pressure in this tubing and in the tubing 68. A wave will be transmitted by the pipe 68 to the air compartment 21' with the result that the diaphragm 22' will be flexed in direct ratio with the respiration of the individual. The flexing of the diaphragm 22' will cause the pen 48' to swing laterally and to draw a graph on the chart 50. The graph will show the respiration of the individual.

When the device is used as a psychograph, the operator at the time of asking a question, presses the plunger 83 and this will cause the pen 48' to make a mark on the chart in the manner already described. Should the person being examined lie, when answering the question, the pulse beat will increase and so will also the blood pressure. This will cause the pen 48 to move more rapidly and also to swing to a higher position on the chart 50. At the same time, the respiration will be momentarily diminished through the fear created in the individual and this will show in the graph being drawn by the pen 48'. In this simple way the device can be used as a lie detector.

At the end of the examination, the knobs 61 and 91 are both swung into "Off" position and this will stop the chart from moving and will also open the tubes 93, 94 and 95, so that the pens 48 and 48' will stop moving. The thumb screw 98a may now be rotated into open position and this will permit the air in the bag 104 and in the high pressure areas in the cylinder 9 to escape. The receptor F may now be removed and also the pressure bag E.

While I have shown only the preferred form of my invention, it should be understood that various changes or modifications may be made within the scope of the appended claims without departing from the spirit of the invention.

I claim:

1. In a device of the type described, a compartment having two opposing walls, a diaphragm secured to each wall and forming a high pressure, air confining space with each wall, means for delivering air under pressure to each space for inflating the diaphragms, the centers of said diaphragms moving towards each other during inflation, said compartment having a low pressure region lying outside of the high pressure spaces, means for placing the low pressure region in communication with the atmosphere, said last-named means being closable for confining the air within the low pressure region, and a diaphragm forming a part of the wall enclosing the low pressure region, said last-named diaphragm flexing in accordance with variations in pressure in the high pressure regions when the low pressure region is closed to the atmosphere.

2. In a device of the type described, two high pressure regions separated from a low pressure region by two diaphragms, means for delivering air to the high pressure regions for moving the centers of the diaphragms toward each other, said low pressure region being confined by a wall, portions of which are formed by the two diaphragms, a third diaphragm also forming a part of the enclosure for the low pressure region and being flexed in accordance with pressure changes in the high pressure regions.

3. A pressure reducing chamber comprising a cylindrical member, a plate covering each end of the member, a diaphragm placed between each plate and the member, means for clamping the plates to the member for sealing the edges of the diaphragms to the plates, means for delivering air under pressure into the spaces provided between the diaphragms and the plates, the centers of the diaphragms being moved toward each other during their inflation, and a third diaphragm forming a part of the cylindrical member, and being flexed in accordance with pressure changes in the spaces formed by the plates and the first two diaphragms.

4. In combination, a moving chart, a rockable shaft, a pen carried by the shaft and contacting with the chart, a cardiograph having a low pressure and two high pressure regions, a diaphragm constituting a part of the closure for the low pressure region, a link and arm operatively connecting the diaphragm with the shaft, two diaphragms separating the high pressure regions from the low pressure region, a tube communicating with the low pressure region and with the atmosphere, a tube for delivering air under pressure to each high pressure region, a header connected to both of said last-named tubes, an air pressure gage connected with the header, pressure sensitive means communicating with the header, a bulb and tube for delivering air under pressure to the header, and means for closing said last-named tube and the tube communicating with the low pressure region.

5. In combination, a moving chart, a rockable shaft, a pen carried by the shaft and contacting with the chart, a cardiograph having a low pressure and two high pressure regions, a diaphragm constituting a part of the closure for the low pressure region, a link and arm operatively connecting the diaphragm with the shaft, two diaphragms separating the high pressure regions from the low pressure region, a tube communicating with the low pressure region and with the atmosphere, a tube for delivering air under pressure to each high pressure region, a header connected to both of said last-named tubes, an air pressure gage connected with the header, pressure sensitive means communicating with the header, a bulb and tube for delivering air under pressure to the header, and means for closing said last-named tube and the tube communicating with the low pressure region and a tension ring for varying the tension on the diaphragm for the low pressure region.

6. In combination, a chart, means for moving the chart at a predetermined speed, a cardiograph having two high pressure regions and a low pressure region, diaphragms separating the high pressure regions from the low pressure region, a diaphragm acted upon by the low pressure region, a pen operatively connected to the diaphragm and movable over the chart, a tube leading from the low pressure region to the atmosphere, means for delivering air under pressure to the high pressure regions and including a tube, a pressure gage and a pressure sensitive device in communication with the high pressure regions, a second pen movable over the chart, manually controlled means for causing the second pen to mark the chart in a predetermined manner, a pneumograph having a low pressure region, a third pen movable on the chart, a diaphragm acted upon by the low pressure region in the pneumograph and being operatively connected to the third pen, a tube placing the low pressure region in the pneumograph in communication with the atmosphere, a second pressure sensitive device communicating with the pneumograph, and a clamp for closing the tubes connected with the low pressure regions of the cardiograph and pneumograph and for also closing the tube connected with the high pressure air delivery means.

7. In a device of the device described, a high pressure region separated from a low pressure region by a diaphragm, means for delivering air to the high pressure region for causing the diaphragm to flex in accordance with changes in pressure in the high pressure region, a second diaphragm having no mechanical connection with the first diaphragm and forming a part of the enclosure for the low pressure region and being flexed in accordance with pressure changes in the high pressure region, and a recording means by the second diaphragm.

8. In a device of the type described, a high pressure region separated from a low pressure region by a diaphragm, said low pressure region communicating with the atmosphere, means for delivering air to the high pressure region for causing the diaphragm to flex in accordance with any changes in pressure in the high pressure region, a second diaphragm forming a part of the enclosure for the low pressure region, and means for closing off communication of the low pressure region with the atmosphere, whereby the second diaphragm will flex in accordance with the pressure changes in the high pressure region.

9. In a device of the type described, a high pressure region separated from a low pressure region by a diaphragm, means for delivering air to the high pressure region to bring the air pressure up to the desired amount, means for varying the air pressure in the high pressure region in accordance with the pulse of an individual, means for venting the low pressure region to the atmosphere, and a recording means actuated by air pressure changes in the low pressure region, said venting means being closed for causing air pressure changes in the high pressure region to affect similar air pressure changes in the low pressure region, whereby the recording means will indicate the changes in the high pressure region.

10. In a sphygmograph having pressure transmitting means adapted to be applied to the body of a patient for transmitting variations in blood pressure and a recording device, an actuating means interposed between said first-mentioned means and said recording device and including a high air pressure region and a low pressure region, a diaphragm separating the two regions, the low pressure region normally opening to the atmosphere, said recording device being operated by changes of pressure in the low pressure region and being unaffected by changes in the high pressure region so long as the low pressure region remains open to the atmosphere, and means for closing off the low pressure region from the atmosphere, whereby variations in pressure in the high pressure area will actuate the recording device.

11. In combination, a moving chart, a pen movable over the chart, a cardiograph having a low pressure region and at least one high pressure region, a diaphragm constituting a part of the closure for the low pressure region, means operatively connecting the diaphragm with the pen for moving the pen in accordance with the flexing of the diaphragm, at least one diaphragm separating the high pressure region from the low pressure region, said low pressure region being normally open to the atmosphere, means for delivering air under pressure to each high pressure region, a pressure sensitive means communicating with the high pressure region, and means for closing the communication of the low pressure region, with the atmosphere.

12. In combination, a chart, movable at a predetermined speed, a cardiograph having at least one high pressure region and a low pressure region, at least one diaphragm separating the high pressure region from the low pressure region, a diaphragm acted upon by the low pressure region, a pen operatively connected to the last-named diaphragm and movable over the chart, said low pressure region being normally open to the atmosphere, means for delivering air under pressure to the high pressure region, an air inflated member communicating with the high pressure region and being sensitive to pressure changes, a second pen movable over the chart, manually controlled means for causing the second pen to mark the chart in a predetermined manner, a pneumograph having a low pressure region, a third pen movable on the chart, a diaphragm acted upon by the low pressure region in the pneumograph and being operatively connected to the third pen, the low pressure region in the pneumograph being normally in communication with the atmosphere, a second pressure sensitive means communicating with the pneumograph, and means for cutting off communication between the low pressure areas in the cardiograph and pneumograph, and the atmosphere.

CLARENCE D. LEE.